United States Patent
Kasagi et al.

(10) Patent No.: US 6,735,969 B2
(45) Date of Patent: May 18, 2004

(54) GAS HEAT PUMP TYPE AIR CONDITIONING DEVICE, ENGINE-COOLANT-WATER HEATING DEVICE, AND OPERATING METHOD FOR GAS HEAT PUMP TYPE AIR CONDITIONING DEVICE

(75) Inventors: Tsukasa Kasagi, Ama-gun (JP); Hiraku Kunita, Nishi-kasugai-gun (JP); Ryuji Morishima, Nagoya-shi (JP); Kazuo Yamagishi, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/209,271

(22) Filed: Aug. 1, 2002

(65) Prior Publication Data

US 2003/0070445 A1 Apr. 17, 2003

(30) Foreign Application Priority Data

Aug. 31, 2001 (JP) ................................ P2001-264909

(51) Int. Cl.⁷ .......................... G05D 23/00; F25B 27/00
(52) U.S. Cl. ...................... 62/238.7; 237/2 B
(58) Field of Search ................. 62/238.7, 323.1, 62/238.6, 125, 185; 165/240; 237/53, 2 B

(56) References Cited

U.S. PATENT DOCUMENTS

| 5,429,179 A | 7/1995 | Klausing |
| 5,435,485 A | * 7/1995 | Atterbury ............ 237/2 B |
| 5,632,442 A | * 5/1997 | Misawa et al. ........ 237/2 B |

FOREIGN PATENT DOCUMENTS

| JP | 55023351 A | * 2/1980 | ........... F02G/1/055 |
| JP | 07012422 A | * 1/1995 | ........... F25B/27/02 |
| JP | 10018830 A | * 1/1998 | ........... F01M/11/00 |

* cited by examiner

Primary Examiner—Chen Wen Jiang
(74) Attorney, Agent, or Firm—Birch, Stewart, Kolasch & Birch, LLP

(57) ABSTRACT

In order to enhance air heating capacity during low outdoor air temperature, a gas heat pump type air conditioning device comprises a compression device having a gas engine driving source and forming a refrigerating cycle by circulating a refrigerant, an engine-coolant-water system, a channel change switching device, a bypass channel which is provided with the channel change switching device in the engine-coolant-water system downstream of the gas engine, and an engine-coolant-water heating device provided in the bypass channel, and waste heat exhausted from the gas engine is collected in the engine-coolant-water, and the refrigerant is heated by the engine-coolant-water so as to enhance air-heating-capacity.

8 Claims, 4 Drawing Sheets

GAS HEAT PUMP TYPE AIR CONDITIONING DEVICE, ENGINE-COOLANT-WATER HEATING DEVICE, AND OPERATING METHOD FOR GAS HEAT PUMP TYPE AIR CONDITIONING DEVICE

BACKGROUND OF THE INVENTION

1. Field of the Invention

This invention relates to a gas heat pump type air conditioning device in which a compression device for circulating a refrigerant is driven by a gas engine as a driving source, and the invention particularly relates to a gas heat pump type air conditioning device which can enhance heating capacity when outdoor air temperature is low.

2. Description of Related Art

An air conditioning device which performs air conditioning such as air cooling and air heating by using a heat pump is provided with a refrigerant circuit including components such as an indoor heat exchanger, a compression device, an outdoor heat exchanger, and a throttling structure. Air cooling and heating indoors is realized by exchanging heat of indoor air and outdoor air temperature by the indoor heat exchanger and the outdoor heat exchanger during the circulation of a refrigerant. Also, in this refrigerant circuit, the receipt of heat during air heating does not rely on only the outdoor heat exchanger, a refrigerant heating device may sometimes by provided for directly beating the refrigerant.

Recently, regarding a driving source for the compression device which is provided in above refrigerant circuit, a driving source employing a gas engine has been developed to replace electric motors which are commonly used. This air conditioning device employing a gas engine is generally called a gas heat pump type air conditioning device (hereinafter called a GHP). By this GHP, because municipal gas or the like which are relatively inexpensive can be used as fuel, thus running cost does not rise because it is different from an electric heat pump provided with compression device using electric motors (hereinafter called EHP), therefore cost can be reduced for consumers.

Also, in a GHP, outstanding air heating effect can be achieved if so-called waste heat such as high temperature exhaust gas exhausted from a gas engine or heat of engine-coolant-water is used as a heat source for the refrigerant during air heating operations, more efficient use of energy is possible as compared with an EHP (electric heat pump). In addition, in this case, the efficiency percentage of energy use of the GHP is 1.2 to 1.5 times higher compared to an EHP. Also, apparatuses above, such as a refrigerant heating device, are not necessary to be installed in the refrigerant circuit if this kind of structure is used.

Additionally, in a GHP, defrosting operations necessary for the outdoor heat exchanging device in air heating can be performed by using the exhaust heat of the gas engine. Generally, the defrosting operation in an EHP is done in such a way that the air heating operation stops and the air cooling operation is temporarily performed to defrost the outdoor heat exchanging device. In this case, because cold air flows into the room, comfortableness inside the room is deteriorated. In contrast, in a GHP, continuous air heating operation is possible because of the above condition, and problems occurring in the case of an EHP do not arise.

As mentioned above, in a GHP, the exhaust heat such as high temperature exhaust gas exhausted from gas engines or waste heat of engine-coolant-water is introduced to a heat exchanging device such as an, exhausted gas heat exchanging device or water heat exchanging device during air heating operation; thus, collecting exhaust heat is possible by using such exhaust heat as a heat source for the refrigerant, outstanding air heating capacity can be obtained differently from EHP.

In conventional GHPs, engine-coolant-water is heated by exhaust heat during the flowing of exhaust gas exhausted from the gas engine through an exhaust gas heat exchanging device; in addition, the engine-coolant-water absorbs heat while flowing inside a water jacket of the gas engine and cooling the water jacket of the gas engine; thus the temperature of the engine-coolant-water rises.

If such high temperature engine-coolant-water which collected the exhaust heat from the gas engine is sent to a water heat exchanging device, the refrigerant can be heated by heat of the engine-coolant-water; thus, the refrigerant can be evaporated sufficiently by a cooperation between a water heat exchanging device and an outdoor heat exchanging device even in an air heating operation when outdoor air temperature is low.

However, there is a limit to the above improvement of the heating capacity achieved by collecting exhaust heat; thus, in other words, there is a limit to the amount of exhaust heat which is collectable; therefore, there has been a limit on the improvement of air heating capacity when the outdoor air temperature is low. In particular, in a case such as that above when a GHP is used in cold areas where the outdoor air temperatures considerably, the amount of heat absorbed from outdoor air temperature in the outdoor heat exchanging device decreases extremely; thus, it is difficult to obtain necessary amounts of heat to sufficiently evaporate the refrigerant.

Accordingly, in order to enable a gas heat pump type air conditioning device to demonstrate sufficient air heating capacity even in an air heating operation in cold temperature are so as to provide a comfortable indoor environment, it is necessary to obtain sufficient amount of heat to evaporate the refrigerant when the outdoor air temperature is low, and to improve the air heating capacity higher.

This invention was made in consideration of above conditions. Thus an object of this invention is to provide a gas heat pump type air conditioning device in which air heating capacity during low outdoor air temperatures can be improved to be higher. Also, an object of this invention is to provide a gas heat pump type air conditioning device which can exhibit sufficient air heating capacity even when the outdoor air temperature is low.

SUMMARY OF THE INVENTION

In order to solve the above problems, the invention has the following construction.

In a gas heat pump type air conditioning device according to the first aspect of this invention, a refrigerating cycle is formed by circulating the refrigerant by a compression device for which the driving source is a gas engine, waste heat exhausted from the gas engine is collected in engine-coolant-water, and the refrigerant is heated by the engine-coolant-water in order to enhance the heating capacity, a bypass channel is formed which is provided with a channel change switching device in an engine-coolant-water system downstream of the gas engine, and an engine-coolant-water heating device is provided in the bypass channel.

According to such a gas heat pump type air conditioning device, a bypass channel is formed which is provided with a channel change switching device in an engine-coolantwater system downstream of the gas engine, and an engine-coolant-water heating device is provided in the bypass channel; thus, it is possible to raise the temperature of the engine-coolant-water by heating it, if necessary, to heat the refrigerant by high temperature engine-coolant-water in order to expedite the evaporation, and to enhance the air heating capacity when the outdoor air temperature is low.

In this case, the heating device should preferably heat the engine-coolant-water by combusting the gas fuel in the same way as above gas engine; thus, it is possible to heat using inexpensive gas fuel by using a similar fuel supplying system as the gas engine.

Also, in the above gas heat pump type air conditioning device, the above heating device should preferably operate when the outdoor air temperature detecting device detects a temperature which is lower than the predetermined value, and during the warm up operation of the above gas engine.

Because of this, even if air heating operation is operated during low outdoor air temperature, because the heating capacity for the refrigerant in the water heat exchanging device decreases, thus air heating operation for realizing the comfortable indoor environment by maintaining the refrigerating cycle is possible.

In an engine-coolant-water heating device according to the second aspect of this invention, an engine-coolant-water heating device is provided in the engine-coolant-water system of the gas heat pump type air conditioning device for heating the engine-coolant-water flowing after cooling the gas engine.

This engine-coolant-water heating device comprises: a frame body which is provided with a ventilation fan; pipes which are provided in the frame body and conduct the engine-coolant-water; a combustor which is provided in the frame body; a fuel supplying system which supplies fuel and air to the combustor at a predetermined ratio, wherein the engine-coolant-water which flows in the pipes is heated by the combusting device.

According to such an engine-coolant-water heating device, the engine-coolant-water heating device comprises a frame body which is provided with a ventilation fan, pipes which are provided in the frame body and through which flow the engine-coolant-water, a combustor which is provided in the frame body, a fuel supplying system which supplies fuel and air to the combustor at a predetermined ratio, and the engine-coolant-water which flows in the pipes is heated by the combustion device; thus, it is possible to heat the engine-coolant-water flowing in the pipes efficiently by the combustion device to raise the temperature.

In this case, the above fuel should preferably be the same fuel as the fuel used in the gas engine; accordingly, it is possible to heat with inexpensive gas fuel by using a similar fuel supplying system as in the case of the gas engine.

Additionally, the most favorable engine coolant heating device is a so-called gas water boiler; thus, an ordinary product found on the consumer market can be used without any modification.

Because of this, even in air heating operation during low outdoor air temperature, because the amount of thermal energy in the refrigerant in the water heat exchanging device increases, air heating operation for realizing the comfortable indoor environment by maintaining the refrigerating cycle is possible.

In an operating method for a gas heat pump type air conditioning device according to the third aspect of this invention, a gas heat pump type air conditioning device in which a bypass channel provided with a channel change switching device is formed in an engine-coolant-water system of the downstream side of the gas engine, an engine-coolant-water heating device is provided in the bypass channel, comprises steps of: forming a refrigerating cycle by a circulation of the refrigerant using a compression device of which driving source is the gas engine; collecting waste heat exhausted from the gas engine to engine-coolant-water, heating the refrigerant by the engine-coolant-water; and operating the engine-coolant-water heating device so as to heat the engine-coolant-water during air heating operation when outdoor air temperature is lower than a predetermined value and during warm up of the gas engine.

According to such an operating method for a gas heat pump type air conditioning device, the engine-coolant-water heating device operates so as to heat the engine-coolant-water during air heating operation when the outdoor air temperature is lower than a predetermined value or during warm up of the gas engine; thus, the temperature of engine-coolant-water is raised and air heating capacity during low outdoor air temperature is improved. Also, because the rise of the temperature of engine-coolant-water is expedited, the time for warm up operation can be shortened.

Because of this, air heating capacity is enhanced during low outdoor air temperature because the temperature of the engine-coolant-water becomes high, and the time for warm up operation can be shortened because increase of the temperature of engine-coolant-water is expedited.

In an operating method for a gas heat pump type air conditioning device according to the fourth aspect of this invention, a refrigerating cycle is formed by a circulation of refrigerant using a compression device of which driving source is a gas engine, exhaust heat exhausted from the gas engine is collected to engine-coolant-water, the refrigerant is heated by the engine-coolant-water so as to enhance air heating capacity, a bypass channel provided with a channel change switching device is formed in an engine-coolant-water system of the downstream side of the gas engine, an engine-coolant-water heating device is provided in the bypass channel.

In the operating method of a gas heat pump type air conditioning device, the engine-coolant-water heating device operates a ventilation fan while stopping supplying fuel to a combustor during air cooling, and the engine-coolant-water heating device is used as a radiator for the engine-coolant-water flowing in pipes.

According to such an operating method for a gas heat pump type air conditioning device, the engine-coolant-water heating device operates a ventilation fan while stopping supply of fuel to a combustor during air cooling, and the engine-coolant-water heating device is used as a radiator for the engine-coolant-water flowing in pipes; thus, it is possible to enhance the capacity of the radiator in operating conditions in which the outdoor air temperature is high, and to prevent the overheating of the gas engine.

Because of this, the occurrence of the overheating in the gas engine GE can be prevented by enhancing the capacity of the radiator for operating conditions in which the outdoor air temperature is high.

BRIEF DESCRIPTION OF THE DRAWINGS

The paragraphs at lines 17–22 have been amended as follows.

DETAILED DESCRIPTION OF THE INVENTION

An embodiment of a gas heat pump type air conditioning device (hereinafter called a GHP) according to the present invention is explained with reference to drawings as follows.

Figure 1:
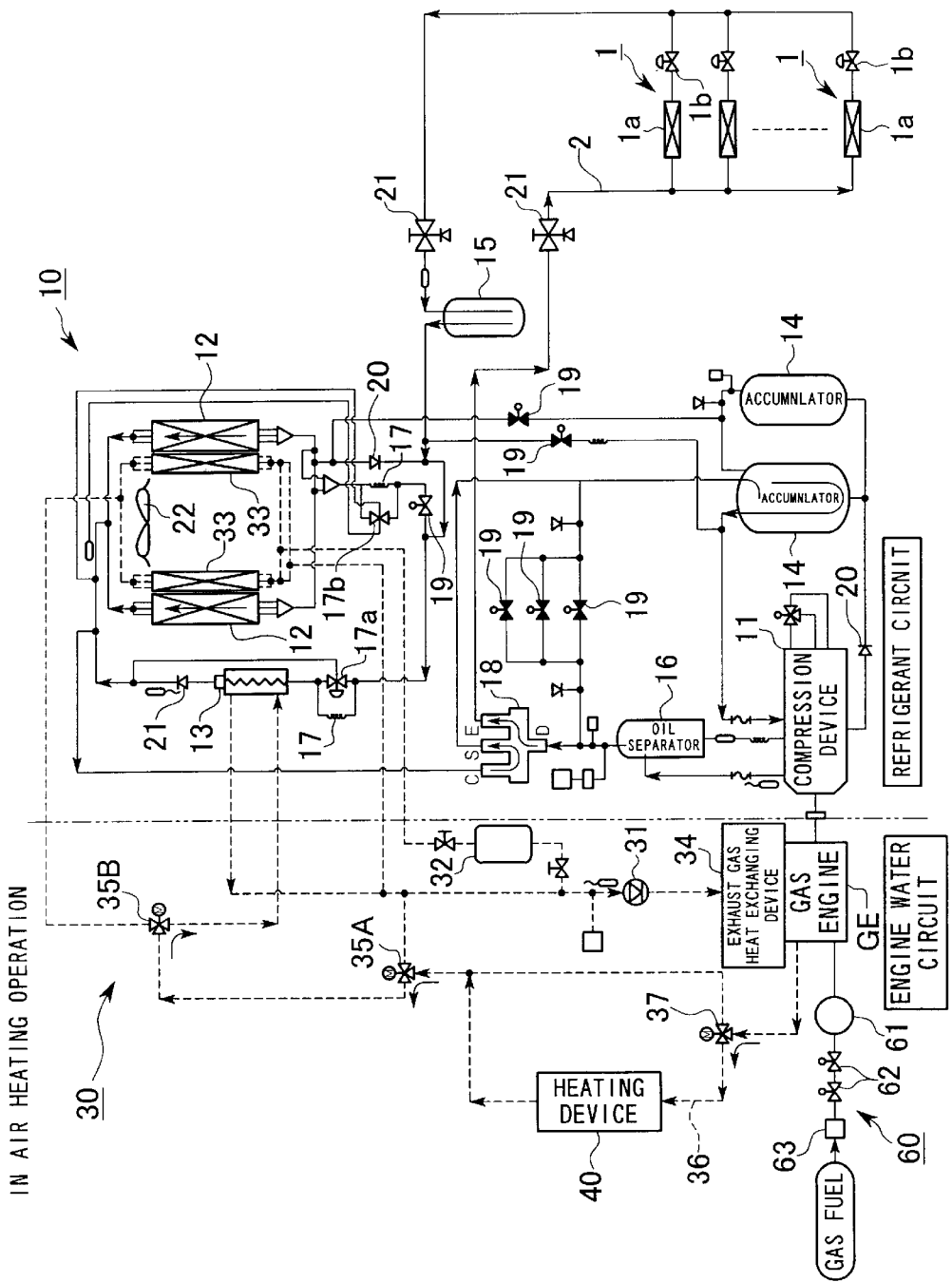
FIG. 1 shows the first embodiment of a gas heat pump type air conditioning device during air heating operations according to the present invention.

FIG. 1 is a system diagram showing an overall construction of air heating system of a GHP as a first embodiment of the present invention. This drawing generally shows an indoor unit 1 and an outdoor unit 10 provided with device such as a compression device for driving the gas engine. In addition, one or a plurality of indoor unit 1 and outdoor unit 10 are connected by refrigerant pipe 2 in such a way that the refrigerant can circulate.

The indoor unit 1 is provided with an indoor heat exchanging device 1a which functions as an evaporator which evaporates the low temperature low pressure liquid refrigerant so as to remove heat from indoor air (indoor atmosphere) during air cooling operation and functions as a condenser which liquefies the high temperature high pressure gas refrigerant so as to heat the indoor air during air heating operation. In addition, throttling structure 1b is provided per indoor heat exchanging device 1a.

The outdoor unit 10 is internally divided into two major sections.

The first major section is a section forming a refrigerant circuit primarily by equipment such as a compression device and outdoor heat exchanging device together with the indoor unit 1, and the first major constructing section is called hereinafter the "refrigerant circuit section".

The second major section is a section provided with equipment such as a gas engine for driving the compression device together with auxiliary equipment, and the second major section is called hereinafter the "gas engine section".

In the refrigerant circuit section, equipment such as compression device 11, outdoor heat exchanging device 12, water heat exchanging device 13, accumulator 14, receiver 15, oil separator 16, throttling construction 17, 4-way valve 18, solenoid valve 19, check valve 20, and control valve 21 are provided.

A compression device 11 is operated by a gas engine GE as a driving source which is to be described later, and the compression device 11 compresses the low temperature low pressure gas refrigerant taken from any one of indoor heat exchanging device 1a or outdoor heat exchanging device 12 and discharges as high temperature high pressure gas refrigerant. By this construction, the refrigerant can radiate the heat to the outdoor air temperature through the outdoor heat exchanging device 12 during air cooling operation even if the outdoor air temperature is high. Also, the refrigerant can give heat to indoor air through the indoor heat exchanging device 12 during air heating operation.

The outdoor heat exchanging device 12 functions as a condenser which liquefies the high temperature high pressure gas refrigerant and radiates to the outdoor air temperature during the air cooling operation, and in contrast, the outdoor heat exchanging device 12 functions as an evaporator which evaporates the low temperature low pressure liquid refrigerant and removes heat from outdoor air temperature during the air heating operation. That is, the outdoor heat exchanging device 12 performs a reverse operation to above indoor heat exchanging device 1a during air cooling operation and air heating operation.

Also, the outdoor heat exchanging device 12 is provided with a neighboring radiator 33 of the gas engine GE which is to be described later. The radiator 33 is a heat exchanging device which refrigerates the engine-coolant-water of the gas engine GE by exchanging heat between outdoor air temperature.

Accordingly, in the case of an air heating operation when the outdoor air temperature is low for example, the indoor heat exchanging device 1a, which functions as an evaporator, can exchange heat between the outdoor air temperature which passed the radiator 33 and heated by selectively changing the rotating direction of the outdoor unit fan 22, and the evaporating capacity can be enhanced.

The water heat exchanging device 13 provided in order that the refrigerant collect heat from the engine-coolant-water of the gas engine GE which is to be mentioned later. That is, in the air heating operation, the refrigerant does not rely only on the exchange of heat in the indoor heat exchanging device 12, it becomes possible to collect waste heat from the engine-coolant-water of the gas engine GE; thus, the effect of air heating operation can be enhanced.

Accumulator 14 is provided in order to store the liquid contained in the gas refrigerant flowing into the compression device 11.

Receiver 15 is provided in order to separate the refrigerant liquefied by the heat exchanging device which functions as a condenser into air and liquid, and to store the surplus refrigerant as liquid in the refrigerating cycle.

Oil separator 16 is provided in order to separate oil content contained in the refrigerant and to return the refrigerant back to the compression device 11.

Throttling construction 17 is provided in order to reduce the pressure of condensed high temperature high pressure liquid refrigerant and to expand the liquid refrigerant so as to make low temperature low pressure liquid refrigerant. In an example of the drawing, a constant pressure expansion valve, thermostatic expansion valve, and capillary tube are selectively used as a throttling construction 17 according to the purpose.

4-way valve 18 is provided on the refrigerant pipe 2 in order to selectively change the channel of refrigerant and the direction of flow. On this 4-way valve 18, four ports such as D, C, S and E are provided. Port D is connected to the discharging side of the compression device 11 by the refrigerant pipe 2. Port C is connected to the outdoor heat exchanging device 12 by the refrigerant pipe 2. Port S is connected to the absorbing side of the compression device 11 by the refrigerant pipe 2. Port E is connected to the indoor heat exchanging device 1a by the refrigerant pipe 2.

On the other hand, in the gas engine section, a coolant water system 30, a fuel absorbing system 60, exhaust gas system, and an engine oil system which is not shown in the drawing are provided where the gas engine GE is provided in the center thereof.

The gas engine GE is connected to the compression device 11 which is provided in the refrigerant circuit by a shaft, a belt and the like; thus, the driving force is conducted from the gas engine GE to the compression device 11.

The coolant water system 30 is provided with a water pump 31, reservoir tank 32, a radiator 33 and the like. This coolant water system 30 chills the gas engine GE by the engine-coolant-water which circulates in the circuit shown by a dashed line organized by connecting these elements by pipes. The water pump 31 is provided for circulating the coolant water of the gas engine GE in the circuit. The reservoir tank 32 is provided for storing the surplus of the coolant water flowing in this circuit temporarily, and for supplying the surplus to the circuit in case the coolant water is in short supply. The radiator 33 is constructed integrally with an outdoor heat exchanging device 12. The radiator 33 is provided for radiating the heat which the engine-coolant-water removes from the gas engine GE to outdoor air temperature.

In the coolant water system 30, in addition to the above elements, an exhaust gas heat exchanging device 34 is provided. This exhaust gas heat exchanging device 34 is provided for collecting the heat of exhaust gas exhausted from the gas engine GE to the engine-coolant-water. Also, in the coolant water system 30, the water heat exchanging device 13 (which was mentioned hereinbefore) is disposed in such a way that the coolant water system 30 spans two systems such as the refrigerant circuit section and the coolant water system 30. Therefore the total construction of the coolant water system 30 is such that the engine-coolant-water not only removes heat from the gas engine GE but also collects heat from exhaust gas during air heating operation; thus, the collected heat is given to the refrigerant from the engine-coolant-water through the water heat exchanging device 13.

Additionally, flow control of engine-coolant-water in the coolant water system 30 is performed by flow control valves 35A and 35B provided in two places.

The fuel absorbing system 60 is provided with a gas regulator 61, a gas solenoid valve 62, a gas connection port 63 and the like. This fuel absorbing system 60 is a system for supplying the municipal gas such as liquefied natural gas (LNG) as gas fuel to the gas engine GE. The gas regulator 61 is provided for adjusting the delivery pressure of gas fuel which is supplied externally via the gas solenoid valve 62 and the gas connection port 63. The gas fuel for which the pressure is adjusted by this gas regulator 61 is supplied to a combustion chamber of the gas engine GE after being mixed with the air absorbed from the absorbing port (not shown in the drawing).

In the present invention, heating device 40 as a heating measure for heating the engine-coolant-water is provided at an appropriate point of the engine-coolant-water system in the GHP with the above construction. This heating device 40 is provided in the bypass channel 36 formed by dividing the engine-coolant-water system after the gas engine GE is chilled. In the branching section of the bypass channel 36, a flow control valve 37 is provided as a channel change switching measure. In an example in the drawing, the bypass channel 36 branches downstream of the gas engine GE, and after that, the branching flow join in the upstream of the flow control valve 35A. The control of the divergence of this flow control valve 37 is possible; therefore, the flow can run in either branch, and also it is possible to split the flow in an appropriate ratio according to need.

The channel change switching measure is not limited to the above flow control valve 37. For example, it is possible to use 3-way valve which cannot control the flow (divergence), and also a combined use of 2 switch valves is possible.

Figure 3:
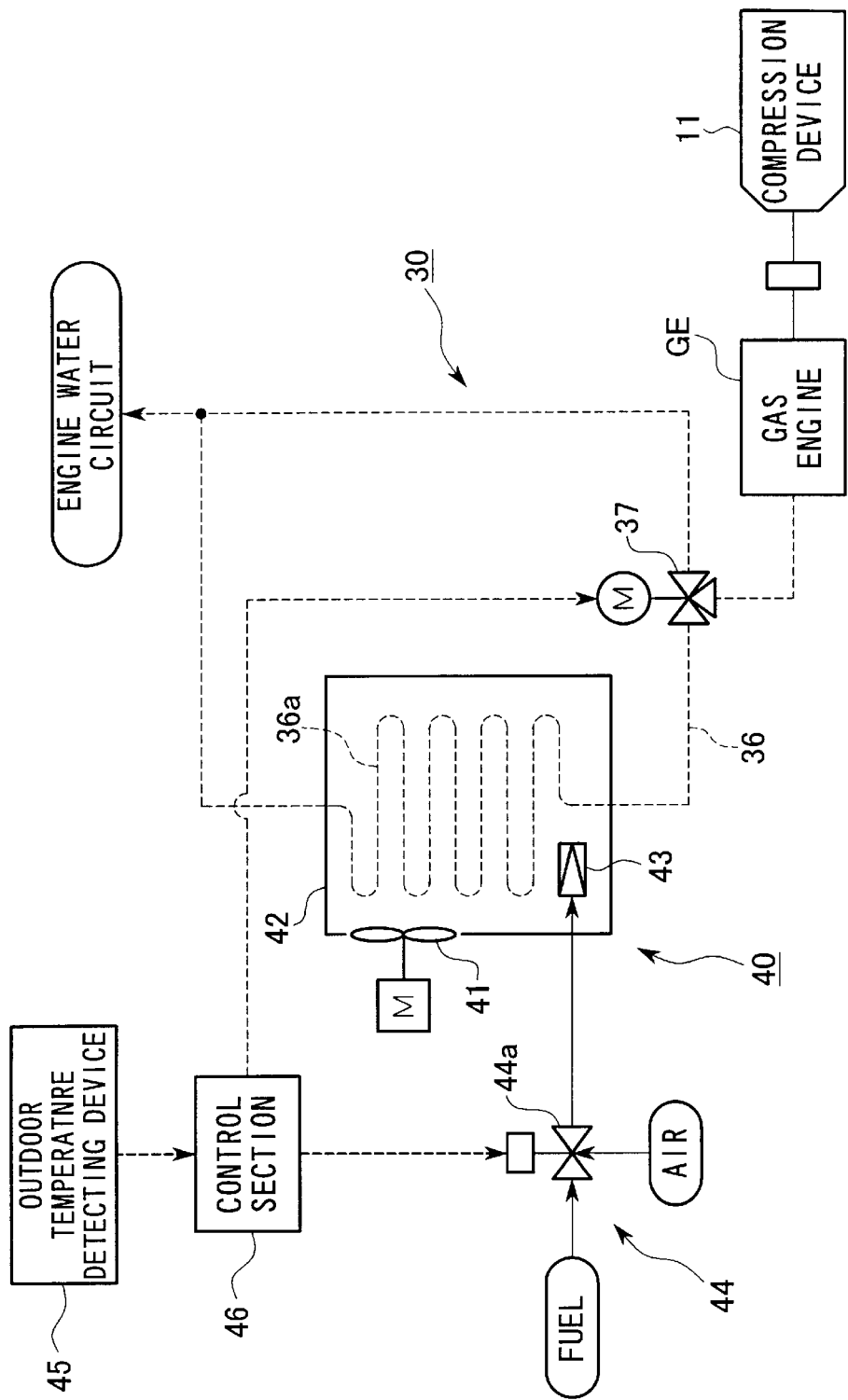
FIG. 3 is an enlarged view of the FIG. 1 showing the heating device and its peripheral parts.

FIG. 3 is an enlarged view of the heating device 40 and its periphery. Here, the heating device 40 is provided in the engine-coolant-water system of a GHP, and the heating device 40 becomes the engine-coolant-water heating device for heating the engine-coolant-water which chills the gas engine GE and flows out thereof. The heating device 40 comprises a frame body 42 provided with ventilation fan 41, pipes 36a which is provided in the frame body 42 and flows the engine-coolant-water, a combustor 43 provided in the frame body 42, a fuel supply system 44 which supplies fuel and air in a predetermined ratio to the combustor 43. The heating device 40 is constructed in such a way that the engine-coolant-water flowing inside the pipes 36a is heated by the combustor 43.

A ventilation fan 41 is provided for the purpose of ventilating the inside of the frame body 42 which contains the pipes 36a and the combustor 43. A combustor 43 receives an air-fuel mixture in which the mixing ratio is appropriate from the fuel supply system 44 and burn the air-fuel mixture to generate high temperature high pressure combustion gas. This combustion gas is exhausted to the outside of the frame body 42 by the ventilation fan 41 after the combustion gas heats the engine-coolant-water flowing in the pipes 36a. The combustor 43 is provided inside the frame body 42; therefore, heating by radiant heat of the flame generated by the combustion of air-fuel mixture can be anticipated.

In the fuel supply system 44, a control valve 44a is provided, and the air-fuel mixture of which the mixing ratio is appropriate is supplied to the combustor 43 via this control valve 44a. The control valve 44a opens when the heating device 40 operates, in other words, when the control valve 44a receives control signals from a controlling section 46 because an outdoor air temperature detecting device 45 detects a temperature lower than a predetermined value during air heating operation. This control signal also handles the channel change switching operation of the above flow control valve 37; therefore, engine-coolant-water which usually flows without passing the bypass channel 36 and the heating device 40 can be introduced to the bypass channel 36 by changing the channel of flow control valve 37 which receives the control signal.

As an outdoor temperature detecting device 45, a temperature sensor which is provided at an appropriate point of the outdoor unit can be named as an example. Also, as another type of outdoor temperature detecting measures, various sensors favorably provided in the channel in which the refrigerant circulates can be used.

In the heating device 40 which is constructed in this way, when a detection signal for low outdoor air temperature is input to the control section 46, the control section 46 opens the control valve 44a to supply fuel and air to the combustor 43 at the same time as changing operation of the flow control valve 37, and then the air-fuel mixture is ignited in the combustor 43. When the air-fuel mixture is burnt in this way, high temperature high pressure combustion gas is generated to heat the engine-coolant-water flowing inside the pipes 36a, thus, the amount of thermal energy attained in the engine-coolant-water increases. Because of this, higher temperature engine-coolant-water is supplied to the water heat exchanging device 13; thus, the amount of heat for heating the refrigerant in the water heat exchanging device 13 increases, and it is possible to evaporate low temperature low pressure liquid refrigerant to supply to the refrigerating cycle even when the outdoor air temperature is low.

The fuel to be used in the above heating device 40 should preferably be a gas fuel such as municipal gas which is the same as the gas used in the gas engine GE. This is because the gas engine GE and the fuel system can be compatibly used with the municipal gas, and the cost of the municipal gas is low. As such a heating device 40, a gas water boiler which can be ordinarily found on the consumer market can be used.

In the following paragraphs, regarding the GHP, a typical way of performing the method of air cooling and air heating for the indoor environment is explained by describing the flow of the refrigerant and the engine-coolant-water.

First, the operating method of the air heating operation is explained with reference to FIG. 1. Regarding the description of the valves, if a valve in the drawing is daubed in black, the valve is open. The direction of the flow of the refrigerant and the engine-coolant-water are shown by arrows.

In this case, in a 4-way valve 18 of the refrigerant circuit, the interval between the port D and the port E, and the interval between the port C and the port S are connected. The discharging side of the compression device 11 is connected to the indoor heat exchanging device 1a. In such a condition, high temperature high pressure gas refrigerant discharged from the compression device 11 is sent to the indoor heat exchanging device 1a through the 4-way valve 18 and the operating valve 21.

High temperature high pressure gas refrigerant exchanges heat with the indoor air in the indoor heat exchanging device 1a to be liquefied. In this process, the gas refrigerant radiates heat to heat the indoor air, and after that, the gas refrigerant becomes high temperature high pressure liquid refrigerant. This liquid refrigerant flows passing a throttling construction 1b, an operating valve 21 and a receiver 15, consequently this liquid refrigerant is separated to air and liquid content.

The liquid refrigerant discharged from the receiver 15 is introduced to the refrigerant pipe 2 to be divided, either portion of which is sent to the water heat exchanging device 13 via the throttling construction 17a of the constant pressure expansion valve. The other liquid refrigerant is sent to the outdoor heat exchanging device 12 through the solenoid valve 19 which is made open and the throttling construction 17b of the thermal expansion valve.

The pressure of liquid refrigerant sent to the water heat exchanging device 13 is reduced by passing through the throttling construction 17a; thus, the liquid refrigerant becomes low temperature low pressure refrigerant. In the water heat exchanging device 13, low temperature low pressure liquid refrigerant is evaporated by absorbing heat from the engine-coolant-water, thus becoming low temperature low pressure gas refrigerant.

At this time, if high temperature engine-coolant-water flows in the radiator 33, the liquid refrigerant can be evaporated efficiently due to the engine waste heat.

In addition, regarding the water heat exchanging device 13 and the outdoor heat exchanging device 12 for evaporating the liquid refrigerant, either one can be chosen favorably according to the operating conditions such as outdoor air temperature. Also the combined use is possible according to the construction of the device.

Such a refrigerant which becomes low temperature low pressure gas is introduced to the accumulator 14 from the port C of 4-way valve 18 via the port S, the air and liquid content of the refrigerant is separated, and is then, taken into the compression device 11. The gas refrigerant taken into the compression device 11 is compressed by the operation of the compression device 11 to become high temperature high pressure gas refrigerant, and is sent to the indoor heat exchanging device 1a again; thus, the refrigerating cycle in which the refrigerant repeatedly changes state can be formed.

In this air heating operation, particularly in the case in which the outdoor air temperature is low and heat cannot be absorbed sufficiently from the outdoor air temperature, the heating device 40 is made to operate according to the control signal from the control section 45 to heat the engine-coolant-water which flows from the gas engine GE; thus, the amount of the retained thermal energy decreases. In this case, the flow control valve 37 is made to operate according to the above control signal, and the channel is changed so as that the engine-coolant-water passes through the bypass channel 36 and the heating device 40.

As a result, engine-coolant-water is heated and reaches a high temperature; in other words, the engine-coolant-water retains more thermal energy, and is supplied to the water heat exchanging device 13.

By doing it in this way, low temperature low pressure liquid refrigerant can be evaporated by receiving more thermal energy from the engine-coolant-water in the water heat exchanging device 13. Therefore, for example, even in cold area where the outdoor air temperature may be below −15° C., a sufficient amount of heat can be obtained without relying on the heat to be absorbed from the outdoor air temperature. That is, even if it is impossible to absorb heat from outdoor air temperature, it is possible to obtain a sufficient amount of heat for heating operation to enable the refrigerating cycle to properly function and to demonstrate the heating capacity satisfactorily.

In addition, in ordinary heating operations in which the outdoor air temperature is not very low, the heating device 40 can be turned off.

Figure 2:
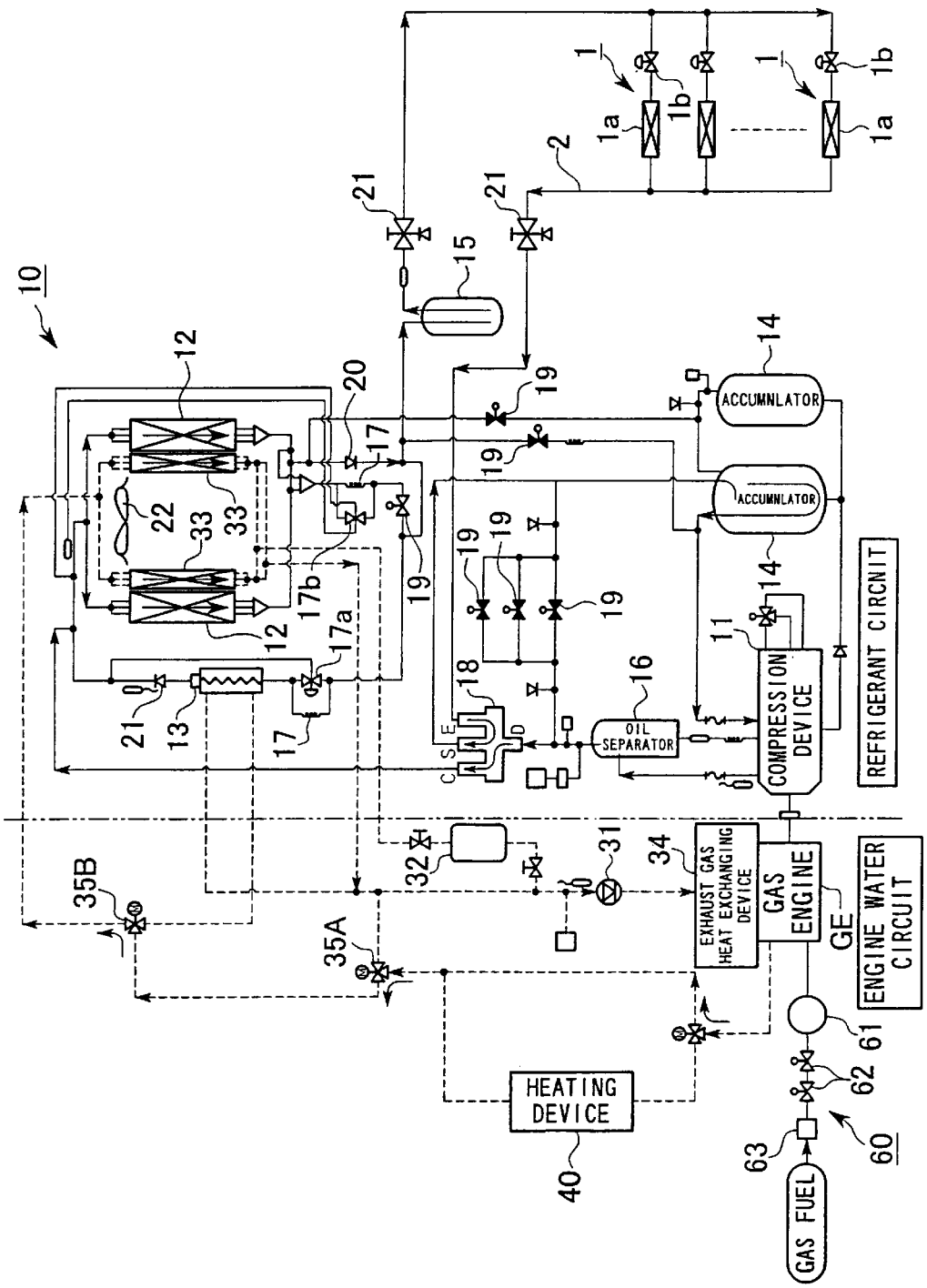
FIG. 2 shows the first embodiment of the gas heat pump type air conditioning device during air cooling operations according to the present invention.

Next, the flow of the refrigerant and the engine-coolant-water in air cooling operation is explained briefly with reference to the FIG. 2.

In this case, in a 4-way valve 18, space are connected between the port D and the port C, and between the port E and the port S. The discharging side of the compression device 11 is connected to the outdoor heat exchanging device 12. In this condition, the high temperature high pressure gas refrigerant discharged from the compression device 11 is sent to the outdoor heat exchanging device 12 which functions as a condenser through the 4-way valve 18.

The high temperature high pressure gas refrigerant is evaporated in the outdoor heat exchanging device 12 to discharge heat to outdoor air temperature; thus, the refrigerant becomes high temperature high pressure liquid refrigerant. This liquid refrigerant is introduced to the receiver 15 through the check valve 20. The liquid refrigerant separated into air and liquid components in the receiver 15 is introduced to the throttling construction 1b through the operating valve 21; then the pressure is reduced in the process of passing through the throttling construction 1b resulting in low temperature low pressure liquid refrigerant, then the liquid refrigerant is sent to the indoor heat exchanging device 1a which functions as an evaporator.

The low temperature low pressure liquid refrigerant sent to the indoor heat exchanging device 1a removes heat from the indoor air and is evaporated. In this process, this refrigerant chills the indoor air and becomes low temperature low pressure gas refrigerant, and is introduced to the 4-way valve 18 through the operating valve 21 and the refrigerant pipe 2.

The low temperature low pressure gas refrigerant introduced to the 4-way valve 18 flows into the accumulator 14 from the port E via the port S. After the liquid content is separated here, the gas refrigerant is absorbed in the compression device 11. The gas refrigerant absorbed by the compression device 11 is compressed by the operation of the compression device, and becomes high temperature high pressure gas refrigerant to be sent to the outdoor heat exchanging device 12; thus, the refrigerating cycle where the refrigerant repeatedly changes state can be formed.

Additionally, in air cooling operations, the above heating device 40 is stopped.

Figure 4:
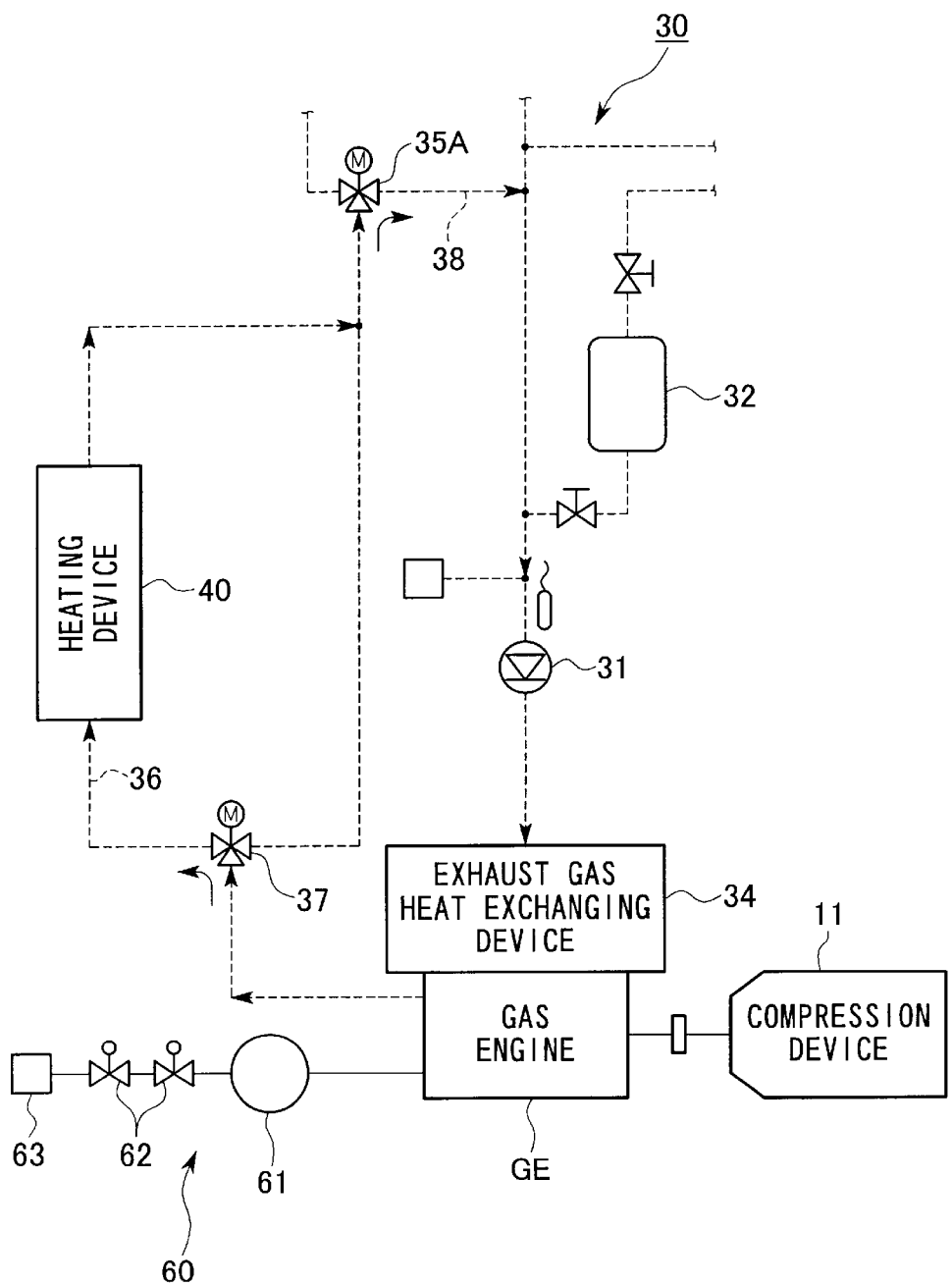
FIG. 4 is an enlarged view of warm up operations.

Regarding the operating method of the above heating device 40, in addition to the operating method so as to enhance the heating capacity during low outdoor air temperature, the device can be operated for warm up operations of the gas engine GE. Such an operating method is explained as follows with reference to FIG. 4.

In this operating method, the flow control valve 37 selects the channel which passes through the bypass channel 36 and the heating device 40, and in addition, the flow control valve 35A selects the channel which passes through the warm up operation channel 38. Also, the heating device 40 is made to operate to heat the engine-coolant-water passing therethrough.

As a result, the engine-coolant-water circulates in pipes of a short closed circuit, in order, such as water pump 31, exhaust gas heat exchanging device 34, gas engine GE, flow control valve 37, bypass channel 36, heating device 40, flow control valve 35A, and warm up operation channel 38. The engine-coolant-water receives heat from the heating device 40 on the way, particularly if this operating method is used when the outdoor air temperature is low, and the warm up operation of the gas engine GE can be completed in a short period of time. If the time for warm up operation is shortened, air cooling and heating operation, which can be a load to the gas engine GE, can be started rapidly.

Also, the above heating device 40 may operate as a radiator for the engine-coolant-water during the air cooling operation.

That is, the flow control valve 37 is changed to the bypass channel 37 and the heating device 40. In the heating device 40 where engine-coolant-water flows, the fuel is not supplied to the combustor 43, and only the ventilating fan 41 is made to operate. By doing this, the engine-coolant-water chills the gas engine GE and the temperature of the engine-coolant-water rises, and the engine-coolant-water flows in the pipes 36a. Thus the engine-coolant-water is chilled by exchanging heat with outdoor air temperature introduced into the frame body 42 by the operation of the ventilating fan 41.

Therefore, particularly if this operation method is used in air cooling operations in which the outdoor air temperature is high, because the capacity of the radiator 33 can be compensated for by air cooling capacity of the engine coolant water, the chilling capacity for the engine-coolant-water is increased, and the occurrence of overheating of the gas engine GE can be prevented.

As explained above, because the heating device 40 which heats the engine-coolant-water according to need is provided during air heating operations, the engine-coolant-water, which retains more thermal energy than before, can be supplied to the water heat exchanging device 13. Because of this, even the cold area where outdoor temperatures may become quite low, the refrigerant can be evaporated with greater amounts of thermal energy in the water heat exchanging device 13. Accordingly, even where the outdoor air temperature is low where sufficient amounts of heat cannot be obtained from outdoor air temperature for evaporating the refrigerant in the indoor heat exchanging device 12, the refrigerating cycle can be maintained by using heat supplied form the engine waste heat and the heating device 40; thus, air heating capacity when the outdoor air temperature is low can be enhanced because of sufficient air heating capacity.

Also, if the heating device 40 of the present invention is used during air heating operations, the time for the warm up operation can be shortened.

In addition, the heating device 40 of the present invention can be used as an auxiliary radiator during air cooling operations or the like; thus, the heat radiating capacity of the engine-coolant-water can also be enhanced.

The construction and features of present invention are not limited to the above embodiment; for example, characteristics of the refrigerating cycle such as the number of devices and modifications can be made within the scope of the present invention.

What is claimed is:

1. A gas heat pump type air conditioning device, comprising:

a compression device having a gas engine driving source and forming a refrigerating cycle by circulating a refrigerant;

an engine-coolant-water system;

a channel change switching device;

a bypass channel provided with the channel change switching device in -the engine-coolant-water system downstream of the gas engine; and an engine-coolant-water heating device provided in the bypass channel;

wherein waste heat exhausted from the gas engine is collected in the engine-coolant-water, and the refrigerant is heated by the engine-coolant-water so as to enhance air heating capacity.

2. A gas heat pump type air conditioning device according to claim 1, wherein the engine-coolant-water heating device is a heating device which is the same as the gas engine in that the engine-coolant-water heating device heats the engine-coolant-water by burning gas fuel.

3. A gas heat pump type air conditioning device according to claim 1, wherein the engine-coolant-water heating device operates at least one of when an outdoor air temperature detecting device detects a temperature lower than a predetermined value, and when the gas engine is warming up.

4. An engine-coolant-water heating device provided in an engine-coolant-water system of a gas heat pump type air conditioning device, and heats engine-coolant-water which flows out after cooling an engine, the engine-coolant-water heating device comprising:

a frame body;

a ventilation fan that selectively exhausts air from and introduces air into the frame body;

a pipe provided in the frame body and adapted to let engine-coolant-water flow therein;

a combustor provided in the frame body; and a fuel supplying system which supplies fuel and air to the combustor at a predetermined ratio, wherein the engine-coolant-water which flows in the pipes is heated by the combustor.

5. An engine-coolant-water heating device according to claim 4, wherein the gas fuel is the same as the gas fuel burned in the gas engine.

6. An operating method for a gas heat pump type air conditioning device having an engine-coolant-water system having a bypass channel downstream of a gas engine where a channel change switching device and an engine-coolantwater heating device are provided in the bypass channel, the method comprising:

forming a refrigerating cycle by circulation of a refrigerant using a compression device having as a driving source the gas engine;

collecting waste heat exhausted from the gas engine to transfer heat to engine-coolant-water in the engine-coolant-water system;

heating the engine-coolant-water by applying heat generated by a combustor directly to the engine-coolant-water system under a predetermined condition; and heating the refrigerant by the engine-coolant-water.

7. The operating method for a gas heat pump type air conditioning device according to claim 6, wherein the additionally heating step includes, additionally heating the engine-coolant-water during at least one of air heating operation when outdoor air temperature is lower than a predetermined value, and warming up operation of the gas engine.

8. An operating method for a gas heat pump type air conditioning device having an engine-coolant-water system having a bypass channel downstream of a gas engine where a channel change switching device and an engine-coolant-water heating device are provided in the bypass channel, the method comprising:

forming a refrigerating cycle by circulation of a refrigerant using a compression device having as a driving source the gas engine;

collecting waste heat exhausted from the gas engine to transfer heat to engine-coolant-water in the engine-coolant-water system;

heating the refrigerant by the engine-coolant-water; and operating a ventilation fan by the engine-coolant-water heating device as a radiator for the engine-coolant-water flowing in pipes while stopping supply of fuel to a combustor during air cooling.

* * * * *